United States Patent [19]
Doss et al.

[11] Patent Number: 5,915,620
[45] Date of Patent: Jun. 29, 1999

[54] APPARATUS FOR HEATING AND VENTILATING A FARM ENCLOSURE

[76] Inventors: James R. Doss, 159 Woodcliff Way, Springdale, Ak. 72764; David J. Mille, 10500 Seven Oaks Rd., Ft. Smith, Ak. 72908

[21] Appl. No.: 08/980,650

[22] Filed: Dec. 1, 1997

[51] Int. Cl.⁶ ............................................. F24F 7/00
[52] U.S. Cl. ................................................. 237/46
[58] Field of Search ................................ 237/46, 50, 53, 237/55; 454/244, 241

[56] References Cited

U.S. PATENT DOCUMENTS

| | | | |
|---|---|---|---|
| 4,584,929 | 4/1986 | Jarmyr et al. | 129/299 |
| 5,002,118 | 3/1991 | Olmstead et al. | 165/54 |
| 5,123,595 | 6/1992 | Doss . | |
| 5,782,104 | 7/1998 | Sami | 62/271 |

*Primary Examiner*—Henry Bennett
*Assistant Examiner*—Derek S. Boles
*Attorney, Agent, or Firm*—Hill & Simpson

[57] ABSTRACT

An apparatus and method for heating and ventilating a farm enclosure. The apparatus includes an energy exchange unit for preheating fresh intake air delivered to the enclosure. The unit has a first air manifold on its upper end including a fresh air intake duct and an exhaust air duct. The unit also has a second air manifold on its lower end which has an intake section and an exhaust section. A turbulation baffle is held within the unit between the first and second air manifolds. The intake section of the second air manifold communicates with the fresh air intake duct of the first air manifold through a plurality of intake baffle sections. The exhaust section of the second manifold communicates with the exhaust air duct of the first air manifold through a plurality of exhaust baffle sections. The intake and exhaust baffle sections are arranged relative to one another creating heat exchange between the two. A first air moving device communicates with the unit for drawing fresh air through the fresh air intake duct of the first manifold, through the intake baffle sections, and out the intake section of the second manifold. A second air moving device communicates with the unit to draw air from within the farm enclosure, through the exhaust section, through the exhaust baffle sections, and out the exhaust duct. One embodiment of the unit also includes a pressurized water clean out system for cleaning out the turbulation baffle.

16 Claims, 3 Drawing Sheets

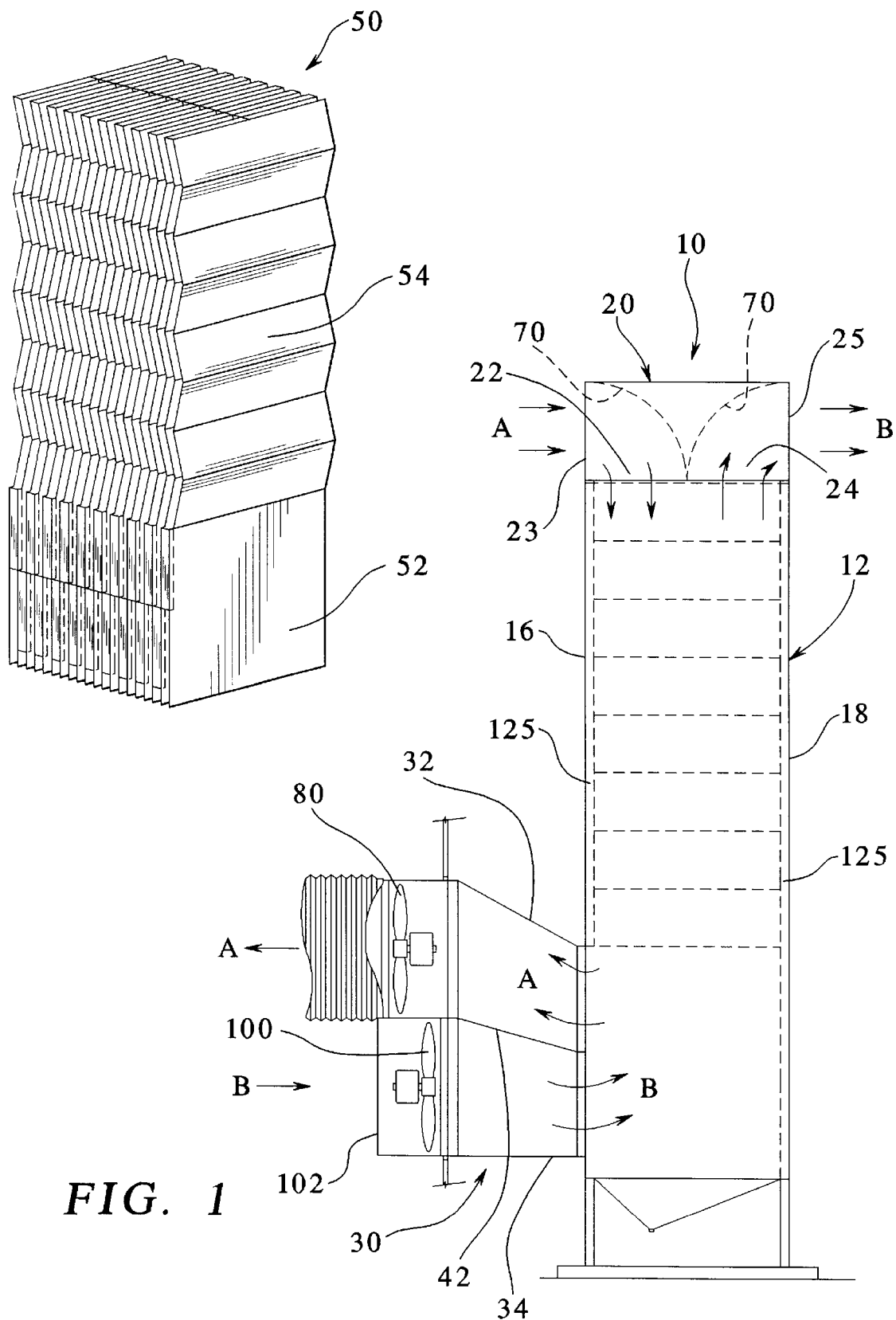

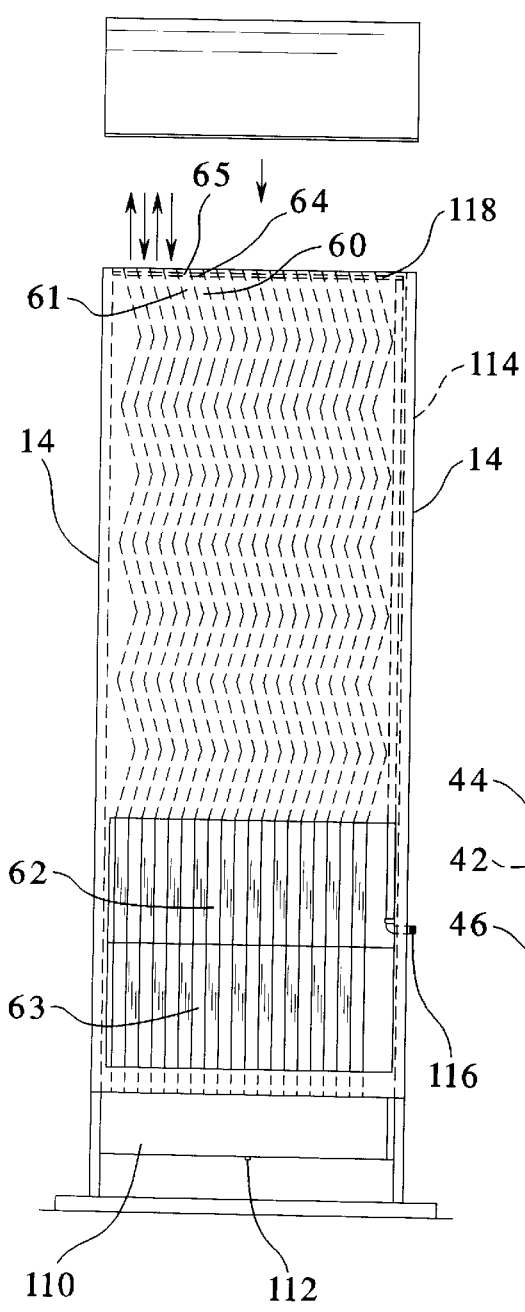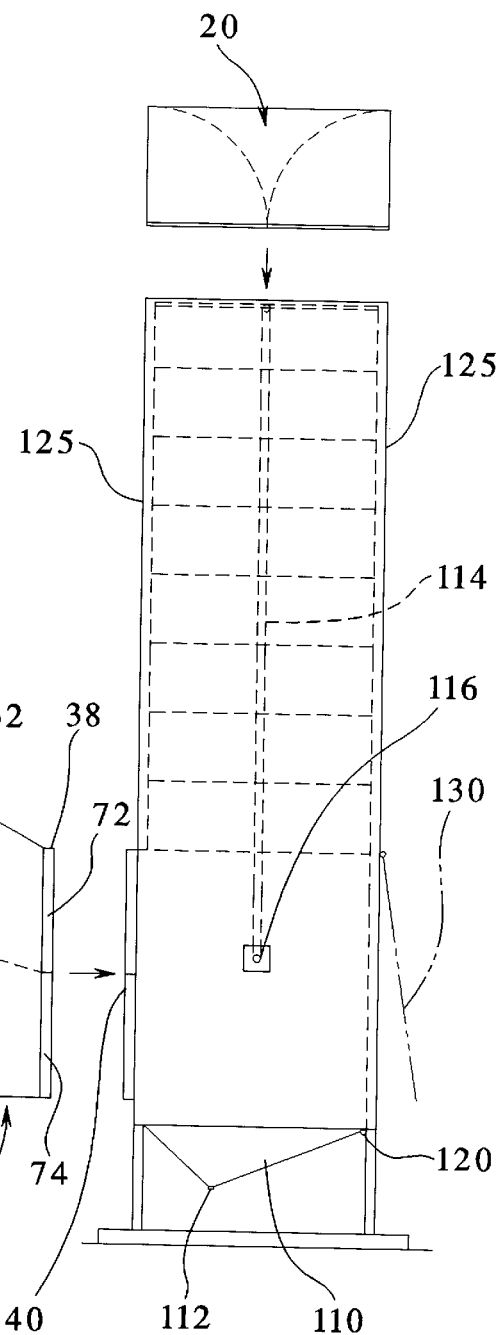

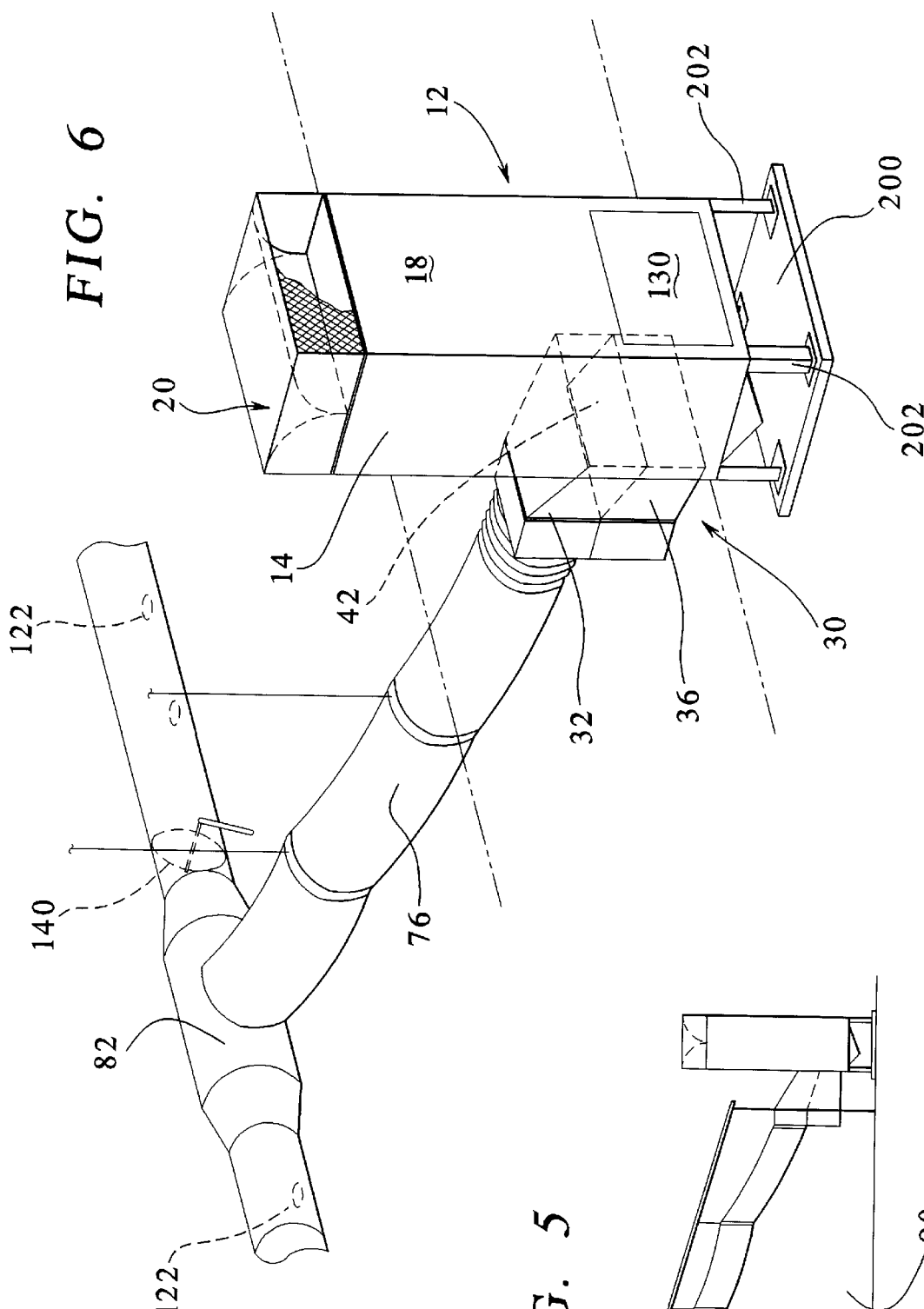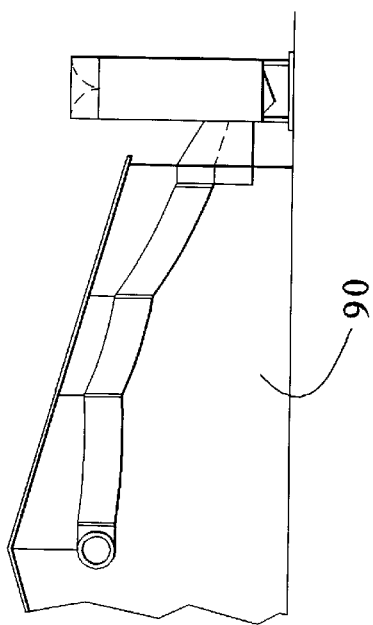

APPARATUS FOR HEATING AND VENTILATING A FARM ENCLOSURE

BACKGROUND OF THE INVENTION

The present invention is directed to an apparatus for growing farm animals such as poultry in an indoor environment, and in particular, is directed to an apparatus for efficiently heating and ventilating a farm enclosure.

In the poultry industry; as well as other industries where domesticated fowl are cared for in an indoor environment, the temperature and ventilation of the environment must be carefully managed. However, proper heating of the indoor environment may complicate the problems associated with ventilation. Similarly, proper ventilation may cause problems in heating the indoor environment. Therefore, it is necessary to strike a proper balance between the two.

The poultry industry has typically utilized a specific arrangement of brooder heaters, exhaust fans and curtains to facilitate the proper heating and ventilation of a poultry house. The brooder heaters are special heating units which provide the necessary heat for the poultry house and are sized according to the number of chickens the house can hold. At a minimum, one 30–40,000 BTU brooder heater should be utilized for every 750 chickens. These brooder heaters can be staggered down the center of the poultry house or, alternatively, staggered from side-to-side throughout the house. The brooder heaters use fully-on or fully-off type burners.

The exhaust fans of a typical poultry house are placed along the length of one of the poultry house walls. In most houses, the exhaust fans are mounted along the North wall. Due to the rigorous ventilation requirements, the exhaust fans employ 36" diameter blades.

The curtains of this type of poultry house are disposed along one side of the house opposite the exhaust fans as well as between the exhaust fans. Together, the curtains and exhaust fans provide the necessary cross-flow ventilation. At a minimum, four fans must be used with separate timers and overrides in houses greater than 350' in length. To provide the necessary ventilation while attempting to maintain heating efficiency, the exhaust fans are operated in a cyclic fashion. In most houses, the exhaust fans are on for a period of two minutes followed by an 8 minute off period.

Many poultry houses of this type are provided with a brooding section which is partitioned off from the rest of the house. Due to the added ventilation requirement of the chicks, two fans are locating in such a brooding section.

Baby chicks, in particular, are extremely sensitive to temperature changes that occur within the poultry house. Any temperature changes prove to be extremely critical during the first three weeks of the six-week grow-out period, which is the time it takes for a baby chicken to grow to a sufficient size for processing. During the grow-out period, as little as a 10° F. temperature deviation may stunt the growth of a chick and cause a chick to experience poor feed conversion, which is the ratio between the amount of food used to feed a chicken per pound of weight of the full grown chicken. The baby chicks are often exposed to such temperature deviations when they wander away from the brooders. Therefore, it is imperative to maintain the temperature throughout the poultry house at a relatively constant level for the duration of the grow-out period.

There are certain known temperatures at which chicks will experience optimal growth and feed conversion. Specifically, during the first three weeks of a typical grow-out period, the poultry house, or brooding section thereof, should be maintained at a temperature that is no less than 85° F. During the second three weeks of a grow-out period, this temperature level should be maintained no less than 72° F.

Ventilation of a poultry house serves three main purposes. First, proper ventilation removes moisture from the indoor environment of the house. Second, proper ventilation removes poisonous gases, such as ammonia and carbon dioxide, from the indoor environment of the poultry house. The ammonia is generated by the baby chicks when their feces are mixed with the moisture laden make-up air and wood chips or rice hulls on the house floor. In an average poultry house, three hundred pounds of chick manure is produced over a 24 hour period which causes a high humidity environment further perpetuating the harmful effects of the ammonia gases which also further promotes the growth of bacteria and fungi. Carbon dioxide is also present in a poultry house as a result of normal respiration. Third, proper ventilation provides fresh breathable air for the chickens. Overall, the air in a poultry house must be exchanged at least four times per hour to supply the baby chicks with enough breathable fresh air to survive.

Feed expenses account for 60% of the cost of producing chickens. Therefore, a proper starting point for optimizing the chicken production process should focus on the feed and its associated variables such as weight of the chickens and feed conversion.

Proper heating and ventilation of a poultry house can have a significant effect on the weight and feed conversion of chickens and, as a result, on the feed costs. When the temperature is too cold, the feed is consumed and converted to body heat rather than tissue for growth. The maximum feed conversion during the six week grow-out period is achieved at 85° F. and 72° F., which are the temperatures noted above. Thus, it must be recognized that there is a delicate balance necessary between eliminating the moisture and gases from the poultry house, while at the same time providing the proper ventilation and warmth for the baby chickens. As noted, the heating and ventilation of the poultry house influences the weight and feed conversion of the chickens. For example, where the chickens are of a good weight but experience poor feed conversion, the house is likely too cool causing a waste of feed from the feeders. Where the chickens are light in weight but experience acceptable feed conversion, the poultry house is likely too warm and the chickens are therefore not receiving sufficient feed or water. If the chickens are light in weight and are further experiencing poor feed conversion, the poultry house ventilation is likely inadequate which causes a build-up of ammonia affecting the growth of the chickens.

The focus of the policies with respect to management of heating and ventilation of poultry houses has in the past been primarily concerned with lowering fuel bills. This perspective loses sight of the most important factor of the grow-out period which is chick comfort. By being overly concerned with energy savings, the chicks are exposed to an unstable environment of sudden temperature changes and improper ventilation thereby causing illness, and even death, among the chicks.

During cold weather operation, growers of chickens are often instructed to keep the curtains closed so that fresh air may be pulled through the cracks and crevices of the house when the exhaust fans are turned on. This policy of keeping the curtains closed, in conjunction with the cycle operation of the exhaust fans, causes two primary problems. First, cold air from the outside is immediately directed through the curtains to the floor when the exhaust fans turn on. Since the temperature of the poultry house is typically warmer than the cold outside air, the baby chicks experience a shock due to the sudden change in temperature. As a result of the influx of cold air, the brooder heaters turn on to raise the poultry house temperature to the proper level. However, at the same time that the brooder heaters are increasing the poultry house temperature, the ammonia and carbon dioxide gas levels as well as the humidity level inside the poultry house are also increasing.

Second, the cyclic exhaust fan operation and the closed curtains cause the poultry house to assume a negative air pressure in comparison or with respect to the ambient outside pressure. Consequently, this generates an improper air flow throughout the poultry house. Additionally, the cyclic operation of the exhaust fans submits the baby chicks to periods of stagnant, ammonia laden, high humidity conditions for about 80% of the time.

U.S. Pat. No. 5,123,592, issued to one of the inventors of the present invention, discloses a method and apparatus for growing poultry or other domesticated fowl in an indoor environment. In this patent, the apparatus more efficiently heats and ventilates a poultry house when combined to conventional techniques. The method disclosed describes utilizing such an apparatus for heating and ventilating a poultry house. The apparatus included an energy exchange unit using the thermal energy of the exhaust air drawn from the poultry house to pre-heat the incoming fresh air supplied to the poultry house. The energy exchange unit had an exhaust air inlet which receives the exhaust air from the poultry house, an exhaust air outlet which releases the exhaust air to the outdoors, a fresh air inlet which receives the cool fresh air from the outdoors, and a fresh air outlet which supplies pre-heated fresh air to the poultry house. The unit included baffles to transfer heat from the exhaust air to the fresh incoming air.

Several possible issues exist in this patented apparatus and method. One such issue is in the difficulty of cleaning and washing the interior of the energy exchange unit. Another possible issue in the patented apparatus and method is in the overall operational efficiency of the thermal exchange unit. Efficiency is relatively low, on the order of about 35%, in terms of thermal heat exchange. An additional possible issue is in the assembly of the unit described in the patent. Additionally, though the patented unit improves the air quality and reduces thermal shock within a poultry house, improvement may be needed in the above two areas.

Thus, it will be recognized that the poultry house environment is in a continuous cycle of change. When the poultry house temperature drops, the brooder heaters turn on. When the brooder heaters turn on, the humidity, ammonia and carbon dioxide concentration levels increase. When those levels increase in this stagnant air condition, the exhaust fans turn on for 2 minutes and then off for 8 minutes. Nothing in the poultry house environment remains constant. The chickens are either too cold or too warm and they are either breathing fresh air for 2 minutes or hot stagnant air for 8 minutes. This ever-changing environment causes illness and death to chickens throughout the entire poultry house. Although the patented heat exchanger apparatus and method significantly improved these conditions, further improvement is necessary in the above mentioned deficient areas.

There is therefore a need in the art for an apparatus for heating and ventilating a poultry house which improve the deficiencies of the conventional techniques and the earlier patented technique described above.

SUMMARY OF THE INVENTION

The present invention provides an improved apparatus for heating and ventilating a poultry house. In an embodiment, an energy exchange unit for heating and ventilating a farm enclosure is disclosed.

Preferably, the energy exchange unit has a first air manifold disposed at an upper end of the energy exchange unit. The first manifold has a fresh air intake duct and an exhaust air duct. A second air manifold is disposed at a lower end of the energy exchange unit and has an intake section and an exhaust section. A turbulation baffle is disposed within the energy exchange unit between the first air manifold and the second air manifold. The intake section of the second air manifold communicates with the fresh air intake duct of the first air manifold via a plurality of intake baffle sections. The exhaust section of the second manifold communicates with the exhaust air duct of the first air manifold via a plurality of exhaust baffle sections. The intake and exhaust baffle sections are disposed relative to one another permitting heat exchange between the baffle sections. A first air moving device communicates with the energy exchange unit and is adapted to draw fresh air from outside the farm enclosure and through the fresh air intake duct of the first air manifold, the intake baffle sections, and out the intake section of the second manifold. A second air moving device communicates with the energy exchange unit and is adapted to draw air from within the farm enclosure and through the exhaust section of the second manifold, the exhaust baffle sections, and out the exhaust duct of the first manifold.

In an embodiment, the first air manifold also has a curved wall section which defines a portion of the fresh air intake duct for redirecting intake air flow from a horizontal orientation to a downward vertical orientation.

In an embodiment, the first air manifold also has a curved wall section which defines a portion of the exhaust air duct for redirecting exhaust air flow from an upward vertical direction to a horizontal direction.

In an embodiment, the first air moving device is an electric fan having variably adjustable rotational speeds.

In an embodiment, the second air moving device is an electric fan having variably adjustable rotational speeds.

In an embodiment, the energy exchange unit also has a cleaning system for cleaning the turbulation baffle. The cleaning system has a pressurized water distribution manifold disposed relative to the turbulation baffle for running pressurized water therethrough.

In an embodiment, the cleaning system also has a clean out pan carried on the lower end of the energy exchange unit with a drain therein for draining water run through the turbulation baffle by the clean out system.

In an embodiment, the clean out pan is hingedly attached to the lower end of the energy exchange unit.

In an embodiment, the clean out system also has a drain disposed at the lower end of the energy exchange unit for draining water run through the turbulation baffle by the clean out system.

In an embodiment, the clean out system also has a pressurized water inlet connected to the energy exchange unit adjacent the lower end and a header pipe extending upward along the energy exchange unit from the water inlet to the water distribution manifold.

In another embodiment of the present invention, an apparatus for heating and ventilating a farm enclosure is disclosed. Preferably, the apparatus has an air distribution system supported within the farm enclosure with a distribution duct adapted to distribute air throughout the enclosure and a connecting duct. Preferably, the apparatus also has an energy exchange unit with a first air manifold is disposed at an upper end of the energy exchange unit. The first manifold has a fresh air intake duct and an exhaust air duct. A second air manifold is disposed at a lower end of the energy exchange unit. The second manifold has an intake section and an exhaust section. A turbulation baffle is disposed within the energy exchange unit between the first air manifold and the second air manifold. The intake section of the second air manifold communicates with the fresh air intake duct of the first air manifold via a plurality of intake baffle sections. The exhaust section of the second manifold communicates with the exhaust air duct of the first air manifold via a plurality of exhaust baffle sections. The intake and exhaust baffle sections are disposed relative to one another permitting heat exchange between the baffle sections. A first air moving device communicates with the energy exchange unit and is adapted to draw fresh air from outside the farm enclosure and through the fresh air intake duct of the first air manifold, the intake baffle sections, and out the intake section of the second manifold. A second air moving device communicates with the energy exchange unit and is adapted to draw air from within the farm enclosure and through the exhaust section of the second manifold, the exhaust baffle sections, and out the exhaust duct of the first manifold.

In an embodiment, the first air manifold also has a curved wall section which defines a portion of the fresh air intake duct for redirecting intake air flow from a horizontal orientation to a downward vertical orientation.

In an embodiment, the first air manifold also has a curved wall section which defines a portion of the exhaust air duct for redirecting exhaust air flow from an upward vertical direction to a horizontal direction.

In an embodiment, the first air moving device is an electric fan having variably adjustable rotational speeds.

In an embodiment, the second air moving device is an electric fan having variably adjustable rotational speeds.

In an embodiment, the apparatus also has a cleaning system for cleaning the turbulation baffle. The cleaning system has a pressurized water distribution manifold disposed relative to the turbulation baffle for running pressurized water therethrough.

In an embodiment, the cleaning system also has a clean out pan carried on the lower end of the energy exchange unit with a drain therein for draining water run through the turbulation baffle by the clean out system.

In an embodiment, the clean out pan is hingedly attached to the lower end of the energy exchange unit.

In an embodiment, the clean out system also has a drain disposed at the lower end of the energy exchange unit for draining water run through the turbulation baffle by the clean out system.

In an embodiment, the clean out system also has a pressurized water inlet connected to the energy exchange unit adjacent the lower end and a header pipe extending upward along the energy exchange unit from the water inlet to the water distribution manifold.

An advantage of the present invention is that the apparatus may be cleaned to maintain relatively high efficiency levels for the heat exchanger.

Another advantage of the present invention is that the inclusion and configuration of an upper manifold increases the overall efficiency of the thermal exchange unit.

A further advantage of the present invention is that the energy exchange unit is simple to assemble.

Other objects, features and advantages of the invention will be readily apparent from the following description of certain preferred embodiments thereof taken in conjunction with the accompanying drawings. Variations and modifications may be effected without departing from the scope and spirit of the present invention and novel concepts of the disclosure as well.

BRIEF DESCRIPTION OF THE DRAWINGS

FIG. 1 illustrates a cross-sectional side view of an energy exchange unit constructed in accordance with the present invention including arrows showing the flow of fresh air (A) and exhaust air (B) through the unit.

FIG. 2 illustrates a plurality of turbulation baffles in side-by-side relationship, as they would be arranged within the interior of the energy exchange unit.

FIG. 3 illustrates a rear plan view of the energy exchange unit of FIG. 1 showing a partial cut away view of the unit.

FIG. 4 illustrates a front plan view of the energy exchange unit of FIG. 1 including arrows showing the flow of exhaust air in solid line (B) and fresh air (A) in broken line proceeding through the heat exchanger.

FIG. 5 illustrates the heat exchanger unit of FIG. 1 as installed in a poultry house.

FIG. 6 illustrates a perspective view of the energy exchange unit in relationship to the fresh air distribution system.

DETAILED DESCRIPTION OF THE PRESENTLY PREFERRED EMBODIMENTS

FIG. 1 illustrates an energy exchange unit 10 of the apparatus of the present invention. The exchange unit 10 extracts thermal energy from the exhaust air extracted from the poultry house as it passes through the energy exchange unit. The extracted thermal energy is then used to pre-heat incoming fresh air before the fresh air is subsequently supplied to the poultry house to replace the stale exhaust air. Although there are many functional aspects of the energy exchange unit 10, it is useful to first consider the overall construction of the unit.

The energy exchange unit 10 is preferably substantially L-shaped when viewed from the side as is illustrated in FIG. 1. A first upstanding rectangular section 12 has a pair of parallel spaced apart side walls 14 and parallel and spaced apart front and rear walls 16 and 18, respectively. A first or upper air manifold 20 is disposed on the top of the upstanding rectangular section 12 and has a fresh air intake duct 22 having an intake opening 23 in the plane of the front wall 16 and an exhaust air duct 24 having an exhaust opening 25 in the plane of the rear wall 18.

Disposed at the bottom of the upstanding rectangular section 12 is a second or lower air manifold 30 having top and bottom walls 32 and 34, respectively, and a pair of side walls 36. The second manifold 30 has an open end 38 which is adapted to sealingly engage with an opening 40 in the bottom of the front wall 16 of the rectangular section 12. The second manifold 30 also has a dividing wall 42 extending horizontally between the side walls 36 dividing the manifold into an intake section 44 and an exhaust air section 46.

Disposed within the upstanding rectangular section 12 is an air turbulation baffle 50 having a lower section 52 communicating with both the intake and exhaust sections 44 and 46 of the second manifold. An upper section 54 of the turbulation baffle fills the remainder of the upstanding rectangular section 12 extending upward to the first air manifold 20.

The turbulation baffle 50 includes a plurality of independent elongate baffle sections 60 and 61 extending the length of the turbulation baffle 50 communicating between the first and second air manifolds 20 and 30, respectively. Each baffle section 60 includes a lower open end 62 communicating with the intake section 44 of the second manifold 30. Each baffle section 61 includes a lower open end 63 communicating with the exhaust section 46 of the manifold 30. The intake baffle sections 60 and open ends 62 communicate with the upper air intake duct 22 via upper open ends 64 disposed at the upper end of the turbulent baffle 50. Similarly, the exhaust baffle sections 61 and open ends 63 communicate with the exhaust air duct 24 via upper open ends 65 at the top of the turbulent baffle 50. Preferably, the baffle sections 60 and 61 alternate side-by-side to achieve the most efficient heat exchange between the exhaust air flowing through the exhaust baffles 61 the intake air flowing through the intake baffles 60.

In the present embodiment, the lower open ends 62 and 63 are formed in a front wall of the turbulation baffle 50 and communicate directly with the respective intake and exhaust sections 44 and 46. As best illustrated in FIG. 2, each lower open end 62 of the intake baffle sections opens into the intake section 44 and is closed off adjacent the exhaust section 46. Similarly, each lower open end 63 of the exhaust baffle sections 61 opens into the exhaust section 46 and is closed off relative to the intake section 44. This construction is an improvement over the turbulation baffle construction of the prior patented invention in that it eliminates dead air space at the lower end of the energy exchange unit. Particularly, the lower end 52 of the turbulation baffle of the present invention extends all the way to the bottom of the upstanding rectangular section. This construction also prevents mixing of the exhaust air and the fresh intake air at the lower end 52 of the turbulation baffle 50 as was possible in the prior unit.

The upper open ends 64 and 65 also communicate directly with the respective intake and exhaust air ducts 22 and 24. The upper open ends 64 of the intake baffle sections 60 open directly into the intake duct 22 and are closed off adjacent the exhaust air duct 24. Similarly, the upper open ends 65 of the exhaust baffle sections 61 open directly into the exhaust air duct 24 and are closed off adjacent the air intake duct 22. Again, this improved construction prevents mixing of exhaust air flowing through the exhaust baffle sections 61 and the intake air flowing through the intake baffle sections 60 and also eliminates any dead air space at the upper end of the rectangular section 12.

The upper portion of the energy exchange unit disclosed in U.S. Pat. No. 5,123,595, discussed above, discloses the upper open ends of the baffle sections opening 90° relative to the direction of air flow and exiting through individual openings formed in the upstanding rectangular section, one opening for each of the baffle sections. This prior construction inhibited the efficiency of the unit. This prior construction was also more complicated to manufacture and thus more expensive to produce than the unit of the present invention.

The air manifold 20 of the invention includes curved wall sections 70 defining the upper wall of the manifold. With this construction, the turbulation baffle 50 includes all of the upper open ends 64 and 65 directing air upward the same direction as the flow through the baffle sections. The curved wall sections 70 of the air manifold 20 redirect the air flowing through the manifold without creating turbulent pockets of air in corners, as did the prior construction. This construction provides for a more efficient energy exchange unit. Tests have proven that this design increases the efficiency of the unit from about 35% for the prior patented unit to about 50% for the unit of the present invention.

The second manifold 30 located at the bottom of the upstanding rectangular section 12 includes openings 72 and 74, one for each of the intake and exhaust sections 44 and 46, respectively. A circular duct 76 is connected to the opening 72 of the intake section 44. Disposed within the circular duct 76 is an air moving device such as a fan 80. The fan 80 draws air through the fresh air intake 22 in the upper manifold 20 and through the respective baffle sections 60 communicating with the intake section 44 of the lower manifold 30. The fan draws the air through this path and forces air into the circular duct 76.

FIG. 6 illustrates in phantom view an air distribution duct 82 connected to the circular duct 76 for distributing air throughout the poultry house 90 as is described in more detail below.

FIG. 1 illustrates a second air moving device 100 such as a fan for drawing air into an air inlet 102 connected to the opening 74 of the second manifold 30 communicating with the exhaust section 46. The fan 100 is adapted to draw air into the air inlet to the exhaust section 46 forcing air upward through the appropriate baffle sections 61 which communicate with the exhaust section 46 and also with the exhaust air duct 24 at the top of the turbulation baffle 50. The fan 100 thus forces exhaust air from within the poultry house through the energy exchange unit and out the exhaust air duct of the air manifold 20.

Another improvement over the prior patented energy exchange unit includes a way to periodically clean out the air passages. A clean-out pan 110 is disposed on the bottom of the upstanding rectangular section 12 and has angled or tapered walls 111 for funneling water and contaminants to the bottom of the rectangular section 12. The clean-out pan 110 preferably includes a drain 112 centrally located therein at the lowest point for releasing any contaminants from the upstanding rectangular section 12. The energy exchange unit 10 preferably also has a pressure wash header pipe 114 extending upward from a water inlet 116 carried on the upstanding rectangular section 12 near its lower end. The water inlet is located on one of the side walls 14 as illustrated in FIGS. 3 and 4. The water inlet 116 is connected to a water source (not shown) for cleaning the upstanding rectangular section. The pressure wash header pipe 114 is connected at its upper end to a water distribution system or manifold 118 for distributing water over the top end of the turbulation baffle 50 creating a flow of high pressure water down the baffle through each of baffle sections 60 and 61.

To clean the energy exchange unit 10, water is received at high pressure through the inlet 116, forced upward through the wash header pipe 114, across the distribution manifold 118 and forced downward through the turbulation baffle 50 moving any dirt or any other contaminants downward through the baffle along with the water. The water and any contaminants are received in the clean out pan 110 and removed therefrom through the drain 112. Such a water cleaning system increases the efficiency of the energy exchange unit over time by keeping the baffle sections 60 and 61 clear of debris, dirt or other contaminants.

Preferably, the clean out pan 110 has hinges 120 along at least one edge thereof so that it may be lowered to manually clean out the bottom portion of the clean out pan 110 or to release contaminants which are too large to exit through the drain 112.

The energy exchange unit 10 of the present embodiment may be constructed from galvanized sheet metal, molded thermo-plastics, or other such durable materials without departing from the scope of the present invention. In the present embodiment, galvanized sheet metal is used in the various sections of the energy exchange unit and attached either through rivets, welding, or conventional screw type fasteners. Preferably, the components separating the intake flow path and the exhaust air flow path are adequately sealed relative to one another so that no flow of gases or air occurs between the two sections.

The arrows "A" within FIGS. 1, 3 and 4 indicate the direction and path of air flow for fresh intake air through the energy exchange unit 10. The arrows "B" indicate the flow path for exhaust air through the unit.

Stale exhaust air "B" is drawn into the air inlet 102 of the second manifold 30 by the air moving device or fan 100. The exhaust air passes through the exhaust section 46 into the open ends 63 of the baffle sections 61. The exhaust air is forced upward by the fan 100 through the appropriate baffle sections 61. The exhaust air then exists the exhaust baffle sections 61 through the open ends 65 and is released into the exhaust air duct 24 of the upper manifold 20. The air pressure provided by the fan 100 forces the air to pass through the exhaust air duct 24 and out to ambient air.

Similarly, intake air "A" is drawn into the fresh air intake duct 22 of the upper air manifold 20 by the reduced air pressure created by the air moving device or fan 80 disposed in the lower manifold 30. The fresh intake air flows through the air intake duct 22 into the upper open ends 64 of the intake baffle sections 60 and is drawn downward through the turbulation baffle 50. The intake air exits the lower open ends 62 of the intake baffle sections 60 and enters the intake section 44 of the second manifold 30. The air is then drawn by the fan 80 through the second manifold and into the circular duct 76. The circular duct 76 connects with the distribution duct 82 which is preferably disposed near the peak of the poultry house 90 as is illustrated in FIG. 6. By such an arrangement, the pre-heated fresh air is distributed throughout the poultry house via a plurality of vents 122 disposed in the bottom of the distribution duct 82.

By having the adjacent baffle sections 60 and 61 alternate between intake flow direction "A" and exhaust flow direction "B", efficient heat exchange takes place between the adjacent baffle sections. If the intake air is relatively cold and the exhaust air taken from the poultry house is relatively warm, the intake air will be warmed via conductive and convective heat transfer from the exhaust air flowing in the adjacent baffle sections 61 prior to entering the poultry house. The meandering shape of the turbulation baffles 60 and 61 enhances the efficient transfer of thermal energy between the exhaust air and the fresh air by forcing the air flowing through each to contact the surfaces of the baffles.

As will be evident to those skilled in the art, the baffle sections 60 and 61 may be formed of discrete channels each fully enclosed from adjacent channels and from portions of the upstanding rectangular section 12. Alternatively, one or the other of the baffle sections 60 or 61 may merely be the interstitial regions or areas between discrete channels defining the other of the spaced apart baffle sections. Such a construction is described in the prior U.S. Pat. No. 5,123,595 noted above. As illustrated in FIGS. 1 and 4, insulation 125 may be added between the turbulation baffle 50 and the rectangular section 12 to further increase efficiency of the unit.

In the present embodiment, it is preferred that the circular duct 76 extending between the energy exchange unit 10 and the distribution duct 82 is also insulated to reduce thermal energy transfer as the air is being transported to the top of the poultry house and the distribution duct. It is also preferable that the distribution duct 82 not be thermally insulated to readily encourage and enhance the transfer of thermal energy between the air within the poultry house and the duct.

The energy exchange unit of the present embodiment may be adapted to operate according to the temperature of the outside air. When the temperature of the outside or ambient air exceeds the temperature desired within the poultry house 90, there is no need to pre-heat the incoming fresh air. Consequently, the second air moving device or fan 100 may simply be shut off or run at a reduced speed. The fan may also be run to aid in pre-cooling warmer intake air if desired.

There is a greater need to pre-heat the incoming fresh air when the temperature of the outside air is significantly below the desired poultry house temperature. The air moving device 100 may be turned on and increased in speed to increase the turbulence characteristics, and consequently the energy transfer, of the air flowing through the baffle sections 60 to increase the heat transfer between the warm exhaust air and the cool intake air. One or more damper valves 140 may be added to the distribution duct 82 for further controlling air distribution within the house 90. The damper valve is also adapted to prevent reverse flow of air back through the duct 82 and circular duct 76 when negative pressure occurs in the intake passages.

FIGS. 5 and 6 clearly illustrate the apparatus of invention including the energy exchange unit 10 in conjunction with a poultry house 90. The unit 10 may be conveniently mounted on a concrete slab 200 disposed beyond the outside walls of the poultry house. The energy exchange unit may further be mounted on height adjustable legs 202 affixed to the concrete slab 200.

It is preferred that the first and second air moving devices 80 and 100 are operable at various speeds depending upon the required energy transfer characteristics for a particular poultry house. For example, a low volume continuous mode is typically required during the first three weeks of a six week chick grow-out period. The speed requirements are otherwise dependent upon the size or number of energy exchange units 10 and the size of the poultry house 90. A high volume continuous mode is necessary during the final three weeks of the chick grow-out period as the chicks produce more waste and poisonous gases and require less heat. Preferably the fans or air moving devices 80 and 100 are adjustable in speed independent of one another depending on the fresh air intake requirements, the heat exchange requirements and the exhaust air requirements for a particular poultry house.

While the discussions regarding this invention have been directed to its particular application with respect to poultry houses, it will be understood by those skilled in the art that the principles underlying this invention are generally applicable to the heating and ventilation of pig houses, livestock houses, etc. In essence, these principles apply to the domestic housing of any animal where it is desirable to maintain control over the environmental conditions within the house.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. An energy exchange unit for heating and ventilating a farm enclosure, the energy exchange unit comprising:

a first air manifold disposed at an upper end of the energy exchange unit and having a fresh air intake duct and an exhaust air duct;

a second air manifold disposed at a lower end of the energy exchange unit and having an intake section and an exhaust section;

a turbulation baffle disposed within the energy exchange unit between the first air manifold and the second air manifold;

a first air moving device communicating with the energy exchange unit and adapted to draw air from outside the farm enclosure and through the fresh air intake duct of the first air manifold, the turbulation baffle, and out the intake section of the second manifold;

a second air moving device communicating with the energy exchange unit and adapted to draw air from within the farm enclosure and through the exhaust section of the second manifold, the turbulation baffle, and out the exhaust duct of the first manifold; and a curved wall section defining a portion of the fresh air intake duct for redirecting intake air flow from a substantially horizontal orientation to a substantially downward vertical orientation and a curved wall section defining a portion of the exhaust air duct for redirecting exhaust air flow from a substantially upward vertical direction to a substantially horizontal direction.

2. The energy exchange unit according to claim 1 wherein the first air moving device comprises an electric fan having variably adjustable rotational speeds.

3. The energy exchange unit according to claim 1 wherein the second air moving device comprises an electric fan having variably adjustable rotational speeds.

4. The energy exchange unit according to claim 1 further comprising:

a cleaning system for cleaning the turbulation baffle, the cleaning system having a pressurized water distribution manifold disposed relative to the turbulation baffle for running pressurized water therethrough.

5. The energy exchange unit according to claim 4 wherein the cleaning system further comprises:

a clean out pan carried on the lower end of the energy exchange unit having a drain therein for draining water run through the turbulation baffle by the clean out system.

6. The energy exchange unit according to claim 5 wherein the clean out pan is hingedly attached to the lower end of the energy exchange unit.

7. The energy exchange unit according to claim 4 wherein the clean out system further comprises:

a drain disposed at the lower end of the energy exchange unit for draining water run through the turbulation baffle by the clean out system.

8. The energy exchange unit according to claim 4 wherein the clean out system further comprises:

a pressurized water inlet connected to the energy exchange unit adjacent the lower end and a header pipe extending upward along the energy exchange unit from the water inlet to the water distribution manifold.

9. An apparatus for heating and ventilating a farm enclosure, the apparatus comprising:

an air distribution system supported within the farm enclosure and having a distribution duct adapted to distribute air through the enclosure and a connecting duct communicating with the distribution duct; and an energy exchange unit having, a first air manifold disposed at an upper end of the energy exchange unit and having a fresh air intake duct and an exhaust air duct;

a second air manifold disposed at a lower end of the energy exchange unit and having an intake section and an exhaust section;

a turbulation baffle disposed within the energy exchange unit between the first air manifold and the second air manifold, the intake section of the second air manifold communicating with the fresh air intake duct of the first air manifold via a plurality of intake baffle sections, and the exhaust section of the second manifold communicating with the exhaust air duct of the first air manifold via a plurality of exhaust baffle sections, the intake and exhaust baffle sections being disposed relative to one another permitting heat exchange between the baffle sections;

a first air moving device communicating with the energy exchange unit and adapted to draw fresh air from outside the farm enclosure and through the fresh air intake duct, of the first air manifold, the intake baffle sections, and out the intake section of the second manifold;

a second air moving device communicating with the energy exchange unit and adapted to draw air from within the farm enclosure and through the exhaust section of the second manifold, the exhaust baffle sections, and out the exhaust duct of the first manifold; and a curved wall section defining a portion of the fresh air intake duct for redirecting intake air flow from a substantially horizontal orientation to a substantially downward vertical orientation and a curved wall section defining a portion of the exhaust air duct for redirecting exhaust air flow from a substantially upward vertical direction to a substantially horizontal direction.

10. The apparatus according to claim 9 wherein the first air moving device comprises an electric fan having variably adjustable rotational speeds.

11. The apparatus according to claim 9 wherein the second air moving device comprises an electric fan having variably adjustable rotational speeds.

12. The apparatus according to claim 9 further comprising:

a cleaning system for cleaning the turbulation baffle, the cleaning system having a pressurized water distribution manifold disposed relative to the turbulation baffle for running pressurized water therethrough.

13. The apparatus according to claim 12 wherein the cleaning system further comprises:

a clean out pan carried on the lower end of the energy exchange unit having a drain therein for draining water run through the turbulation baffle by the clean out system.

14. The apparatus according to claim 13 wherein the clean out pan is hingedly attached to the lower end of the energy exchange unit.

15. The apparatus according to claim 12 wherein the clean out system further comprises:

a drain disposed at the lower end of the energy exchange unit for draining water run through the turbulation baffle by the clean out system.

16. An apparatus for heating and ventilating a farm enclosure, the apparatus comprising:

an air distribution system supported within the farm enclosure and having a distribution duct adapted to distribute air through the enclosure; and an energy exchange unit having,
- a first air manifold disposed at an upper end of the energy exchange unit and having an intake duct and an exhaust air duct;
- a second air manifold disposed at a lower end of the energy exchange unit and having an intake section and an exhaust section;
- a first air moving device communicating with the energy exchange unit and adapted to draw air from outside the farm enclosure and through the intake duct, of the first air manifold, and out the intake section of the second manifold;
- a second air moving device communicating with the energy exchange unit and adapted to draw air from within the farm enclosure and through the exhaust section of the second manifold, and out the exhaust duct of the first manifold; and a curved wall section defining a portion of the intake duct for redirecting intake air flow from a substantially horizontal orientation to a substantially downward vertical orientation and a curved wall section defining a portion of the exhaust duct for redirecting exhaust air flow from a substantially upward vertical direction to a substantially horizontal direction.

* * * * *